(12) United States Patent
Spezia et al.

(10) Patent No.: US 11,663,209 B2
(45) Date of Patent: May 30, 2023

(54) DISTRIBUTED COMPUTER SYSTEM FOR DELIVERING DATA

(71) Applicant: AMADEUS S.A.S., Biot (FR)

(72) Inventors: Didier Spezia, Nice (FR); Simon Huet, Biot (FR); Damien Profeta, Mouans-Sartoux (FR); Xavier Bourgouin, Antibes (FR)

(73) Assignee: AMADEUS S.A.S., Biot (FR)

( * ) Notice: Subject to any disclaimer, the term of this patent is extended or adjusted under 35 U.S.C. 154(b) by 58 days.

(21) Appl. No.: 16/951,062

(22) Filed: Nov. 18, 2020

(65) Prior Publication Data

US 2021/0149902 A1     May 20, 2021

(30) Foreign Application Priority Data

Nov. 20, 2019    (FR) ...................................... 1912922

(51) Int. Cl.
*G06F 7/00*         (2006.01)
*G06F 16/2453*    (2019.01)
(Continued)

(52) U.S. Cl.
CPC ...... *G06F 16/24532* (2019.01); *G06F 16/188* (2019.01); *G06F 16/2255* (2019.01);
(Continued)

(58) Field of Classification Search
CPC ............. G06F 16/24532; G06F 16/188; G06F 16/2452; G06F 16/2255; G96F 16/2329
See application file for complete search history.

(56) References Cited

U.S. PATENT DOCUMENTS 10,558,699 B2 *  2/2020  Maybee ............... G06F 9/45558
10,884,984 B2 *  1/2021  Maybee .................... G06F 1/28
(Continued)

FOREIGN PATENT DOCUMENTS

EP      3825863 A1 *  5/2021
FR      3103299 A1 *  5/2021
WO   WO0235359 A2 *  5/2002

OTHER PUBLICATIONS

John Henry Hartman, "The Zebra Striped Network File System" (University of California at Berkeley, 1994).*
(Continued)

*Primary Examiner* — Daniel A Kuddus
(74) *Attorney, Agent, or Firm* — Perry + Currier, Inc.

(57) ABSTRACT

A distributed computer system for delivering data to client-side application(s) is provided. The system includes a database configured to store immutable data blocks, a data distribution entity configured to split source-data into immutable data blocks and metadata. The data distribution entity is configured to replicate and store the data blocks on different storage nodes(s) of the database. The metadata comprises values referencing the data blocks for a key-value database call. The system further comprises a data fetching/delivering entity with a fuse-daemon configured to form a quorum read request for data block(s) out of a client-side request for a certain data range. The quorum-read request is a bundle of parallel requests to different storage nodes. The fuse-daemon is configured to fetch the data blocks delivered in the fastest response and to discard the rest. The fuse-daemon generates a virtual file comprising the corresponding range of data from the fetched data blocks.

18 Claims, 4 Drawing Sheets

(51) Int. Cl.
 *G06F 16/23* (2019.01)
 *G06F 16/2457* (2019.01)
 *G06F 16/188* (2019.01)
 *G06F 16/2452* (2019.01)
 *G06F 16/22* (2019.01)

(52) U.S. Cl.
 CPC ...... *G06F 16/2329* (2019.01); *G06F 16/2452* (2019.01); *G06F 16/24573* (2019.01)

(56) References Cited

U.S. PATENT DOCUMENTS

| | | | |
|---|---|---|---|
| 2002/0133491 A1* | 9/2002 | Sim | G06F 16/10 |
| 2004/0205152 A1* | 10/2004 | Yasuda | G06F 16/184 |
| | | | 709/217 |
| 2010/0132012 A1* | 5/2010 | van Riel | G06F 21/53 |
| | | | 726/1 |
| 2010/0132013 A1* | 5/2010 | van Riel | G06F 21/53 |
| | | | 726/1 |
| 2013/0133051 A1* | 5/2013 | Riemers | G06F 21/30 |
| | | | 726/7 |
| 2018/0196820 A1* | 7/2018 | Kremer | G06F 3/0605 |
| 2018/0196825 A1* | 7/2018 | Maybee | G06F 11/3006 |
| 2018/0196831 A1* | 7/2018 | Maybee | G06F 11/3495 |
| 2020/0159760 A1* | 5/2020 | Maybee | H04L 9/0637 |
| 2020/0218752 A1* | 7/2020 | Kremer | H04L 63/0428 |

OTHER PUBLICATIONS

Hartman, John H. et al. "The Zebra striped network file system." ACM Transactions on Computer Systems (TOCS) 13.3 (1995): 274-310.

\* cited by examiner

DISTRIBUTED COMPUTER SYSTEM FOR DELIVERING DATA

FIELD OF THE INVENTION

The present invention generally relates to a distributed data storage system, in particular to a distributed data storage system for heavy read access data that is rarely modified. The distributed data storage system is to deliver ranges of data to client-side applications distant to the data storage network.

BACKGROUND

EP 1 364 510 pertains to a method of efficiently managing storage in a distributed network having a plurality of connected nodes comprising the steps of: determining when a certain file storage parameter exceeds a pruning threshold; and performing a pruning cycle including: (a) identifying the content components associated with the storage; (b) selectively pruning the content components based at least in part on usage statistics so that the file storage parameter is reduced to below the pruning threshold; and (c) updating meta data associated with the content components to reflect the updated storage system parameters and further comprising (d) presenting the contents of the updated storage network as a virtual file system so that all the files appear locally accessible to any node.

SUMMARY OF THE INVENTION

According to first aspect, a distributed computer system for delivering data to at least one client-side application is provided. The distributed computer system comprises a database configured to store immutable data blocks, a data distribution entity configured to split source-data into immutable data blocks and metadata, wherein the data distribution entity is configured to replicate the immutable data blocks and to store the immutable data blocks on at least two different storage nodes of the database, wherein the metadata comprises values referencing the immutable data blocks in the at least two storage nodes for a key-value database call. The distributed computer system further comprises a data fetching and delivering entity comprising a fuse-daemon configured to translate a request for a range of data of a file triggered by at least one client-side application into a quorum-read request for at least one immutable data block to the database, wherein the quorum-read request comprises a plurality of individual parallel requests to different storage nodes storing the same immutable data block, wherein the fuse-daemon is configured to fetch the data blocks delivered by the database in the fastest response and is configured to discard results delivered subsequently to the fastest response, wherein the fuse-daemon is configured to generate a virtual file comprising the corresponding range of data from the fetched data blocks.

According to a second aspect, a method of delivering data to at least one client-side application, is provided. The method is executable on the distributed computer system according to the first aspect, the method comprising: splitting source-data into immutable data blocks and metadata, replicating and storing said data blocks on at least two different storage nodes of a database, wherein the metadata comprises values referencing the immutable data blocks in the at least two storage nodes for a key-value database call, translating a request for a range of data of a file triggered by at least one client-side application into a quorum-read request for at least one immutable data block to the database, wherein the quorum-read request comprises a plurality of individual parallel requests to different storage nodes storing the same immutable data block, fetching the data blocks delivered by the database in the fastest response and discarding results delivered subsequently to the fastest response, generating a virtual file comprising the corresponding range of data from the fetched data blocks.

According to a third aspect, a computer program product comprising program code instructions stored on a computer readable medium to execute the method steps according to the second aspect, when said program is executed on a computer, is provided.

A distributed computer system for delivering data to at least one client-side application is provided. The computer system is distributed as such that data required by the client-side application is stored on a database that is located distant to the client-side application(s) and is connected to these applications over a computer network. The client-side applications are for example flight booking applications querying airport lists or the like. Those applications might run their back-ends on particular application servers. The distributed computer system may provide fast, reliable and scalable to data that may be the same for thousands of servers and does not change too often, i.e. it remains constant for at least for thousands of read requests. In this sense the distributed computer system comprises a read oriented distributed filesystem.

The distributed computer system comprises a database to store immutable data blocks. The data blocks may contain, for example, portions of the data demanded by the client-side application, such as portions of an airport lists or arrival time/departure time schedules for an airline. The data blocks are immutable in the sense that the only way of changing the data contained by the data block(s) is to replace the entire data block(s).

The distributed computer system further comprises a data distribution entity to split source-data into the immutable data blocks and metadata. The data distribution entity might include a distribox for splitting up data of a file into data blocks and a persistent file storage coupled to a distribox back-end in which the datafiles to be split into immutable data blocks and metadata are stored.

The data distribution entity is configured to replicate the immutable data blocks and to store the immutable data blocks on at least two different storage nodes of the database. As such, if a source-data in the form of a data file is split into five immutable data blocks, these five blocks might be distributed onto five different storage nodes. However, for example, two copies of these blocks might be stored on altogether ten additional storage nodes of the database. The file system which is employed on the data base may be a Redis based file system.

The metadata comprises values referencing the immutable data blocks in the at least two storage nodes for a key-value database call. The values referencing the immutable data blocks may be a set of unique identifiers for certain data blocks. These identifiers could be created out of an immutable data block number, a value derived from the content of the data block or the like. The key-value database call in this sense is, for example, a database call for an immutable data block corresponding to the identifier used in the database call request. The metadata could further comprise information about the file type of the data blocks in order to distinguish between deduplication friendly files (e.g. SQLite) and others.

The distributed computer system further comprises a data fetching and delivering entity. The purpose of the data fetching and delivering entity is, for example, fetching the immutable data blocks stored on the database and delivering data extracted from these immutable data blocks to the client-side application(s). The extracted data might correspond to the range of data of a file requested by the client-side application.

The data fetching and delivering entity comprises a fuse-daemon that is to translate a request for a range of data of a file triggered by at least one client-side application into a quorum-read request for at least one immutable data block to the database. The fuse-daemon is, for example, a subroutine of an operating system or could be a subroutine of a FUSE file system. The fuse-daemon translates the request for a range of data of a file to requests for immutable data blocks.

The fuse-daemon, for example, uses the values referencing the data blocks comprised by the metadata and a range-to-block mapping information to formulate the requests for a certain immutable data block or a computation rule of how to translate the request for a range of data of a file to a request to particular immutable data blocks comprising this range to fetch the correct immutable data blocks.

The individual requests for immutable data blocks corresponding to the requested range of data of a file are bundled to the quorum read request as follows:

The quorum-read request comprises a plurality of individual parallel requests to different storage nodes storing the same immutable data block. As mentioned above, the copies of immutable data blocks are redundantly stored on a plurality of different storage nodes. The parallel requests are directed to these different storage nodes.

A characteristic of immutable blocks is that they are redundant, as no immutable block can ever differ from a different immutable block of the same file version. As they are redundant, a quorum read will give the exact same result for each of the parallel queries of the quorum read, so that a selection based on the fastest response is possible.

To provide an example, if the file has 5000 bytes and the block are 1000 bytes long, there will be 5 blocks. And when the application interface of the client-side application will ask to read data from offset 500 to 1500, the fuse daemon will perform a quorum read two times, once for block 0-1000 and once for block 1000-2000. The other blocks will not be fetched. If later on, the application interface request bytes 1500-2000 it will be served from a cache in which the immutable data blocks are stored, e.g. a page cache. If, however, the bytes 4000-4500 are requested, another quorum read will be issued by the fuse daemon.

The fuse-daemon is configured to fetch the data blocks delivered by the database in the fastest response and is configured to discard results delivered subsequently to the fastest response. For some reasons, for example, latency or workload, one of the storage nodes might be able to response more quickly than others. Nonetheless, all storage nodes to which a request is directed will process the requests of the quorum read and deliver results. However, only the fastest results (=immutable data blocks requested) will be fetched by the fuse daemon and delivered, for example, to a data repository of the data fetching and delivering entity located close to the client application(s). In some examples, upon receiving the fastest response, the fuse daemon might order the storage nodes of the database to cancel processing of the not yet served requests.

The fuse-daemon is configured to generate a virtual file comprising the corresponding range of data from the fetched data blocks. The virtual file is, for example, a file that is located close to the client-application to enable fast retrieval of data stored in said virtual file to the client-side application. The virtual file might store only the data contained in the immutable data blocks that corresponds to the requested range and might discard the rest. The request for a range of data of a file will then be answered by the data fetching and delivering entity by means of the data stored in the virtual that corresponds to the requested range of data. The file is referred to as a virtual file as the client application cannot distinguish the data delivered from the virtual file from a data delivered by a remote database. As such the structure and access patterns to the file from which the range of file is requested are free and in the responsibility of the client application(s) instead of the access patterns being managed by the database.

In some examples, the data fetching and delivering entity comprises an operating system having an operating system page cache, wherein the operating system page cache is configured to store at least the parts of the fetched data blocks corresponding to the range of data of a file requested by the client-side application.

The operating system is, for example, a POSIX supporting operating system, such as a UNIX operating system. The page cache of said operating system is, for example, a cache of a UNIX, e.g. LINUX, kernel. This page cache may be implemented on a Openshift node which is in communication with the client-side application(s) as point of deliveries (POD). The fuse daemon may be configured to keep fetched data blocks in the page cache as long as possible, hence, until the file and with it—the data block—has changed. Whenever more up-to-date data blocks are available, the new data block may be fetched and pushed to the page cache by the fuse daemon. Either all the fetched immutable data blocks containing the requested range of a file are stored in the page cache or only a data content extracted from the data block that corresponds exactly to said requested range.

In some example, the data in the virtual file is retrievable by the at least one client-side application as response to the request for a range of data of a file and as response to any future request for the same range of data of a file. Hence, the requested data range is deliverable directly when the request for said data is repeated. This saves computational resources needed for a new (quorum read) query to the database if the data is already available in the client-side page cache.

In some examples, the database comprising the storage nodes is a NoSQL database. A NoSQL database is a database that cannot be served by SQL call commands and is, for example, not a relational database at all. Such a NoSQL database could be a database with an append-only mechanism, hence, a database for which it is impossible to insert an entry between two prior existing entries in a list, but new entries have to be added to that list, after the prior existing entries. The database might be a Redis cluster optimized for heavy read/low write operations with high data availability.

In some examples, wherein the values comprised by the metadata are referencing values referencing the immutable data blocks for a key-value database call, these referencing values being generated through hash values of each corresponding data block.

To provide an example, each immutable data block is hashed and the resulting hash value is used as a key for this immutable data block, and referenced in the metadata, which is, for example, a file metadata. As such, there may be records in the file metadata about the immutable data blocks comprised by the file for which the range is requested. These records may include information about which hash value, corresponding to said key value in the key/value data base call, stands for which immutable data block of the file. As mentioned above, each referenced immutable data block is replicated to at least three nodes. For example, those immutable data blocks containing data within the requested range of data are fetched, those not containing data within this range are not fetched.

However, in some examples, the database is configured to deliver data corresponding to the file including data of a data block outside of the requested range of the file. As such, for example, also the data blocks adjacent to or in a certain range around the data blocks containing data within the requested range are also fetched. Furthermore, simply all immutable data blocks of a file could be fetched.

In some examples, the virtual file comprises, along with the range of data requested, the metadata of data blocks corresponding to data outside of the requested range of the file. In general, for example, the metadata may be delivered by the database to the data fetching and delivering database upon the request for the range of data of a file or before a request for the range of data of a file.

Hence, in some examples, the fuse daemon is configured to generate the virtual file comprising the metadata. The metadata might be stored in the virtual file on the data fetching and delivering entity, where the metadata might be used in formulating a query for (i) the data structure of the file and/or (ii) certain immutable data blocks comprised in the file by the quorum read.

In some examples, the fuse-daemon is configured to perform the query for the quorum read operation at least three times in parallel and wherein the same data blocks are stored at least three times on at least three different database storage nodes. In this case, the number of queries performed in the quorum read corresponds to the number of nodes on which copies of the immutable data blocks are stored. Each of the three queries will be then, for example, directed a different one of those three storage nodes. In this example, not more copies are stored than queries to be performed, limiting the used storage capacity to the minimum amount necessary to process each query in competition with each other.

In some examples, the fuse-daemon is configured to perform the query for the quorum read operation three times in parallel and wherein the same data blocks are stored five times on at least five different database storage nodes. In this example, the immutable data blocks are replicated on more storage nodes than actually needed for processing the three queries of the quorum read. This, however, increases data availability, as even if two storage nodes failed, there are still enough functional storage nodes to perform the quorum read operation successfully. Furthermore, the number of queries in a quorum read operation could be flexibly increased to five queries when storing five immutable data block copies on five different storage nodes.

In some examples at least two client-side applications employ a common middleware client library to access the virtual file. Middleware could be defined, for example, as the software layer that lies between the operating system and applications on each side of a distributed computing system in a network. Providing a common middleware client library to access the virtual file saves resources in the communication between the virtual file and the client-side applications. This communication might take place over dedicated interfaces.

In some examples, the data fetching and delivering entity comprises a file interface being compatible to at least one portable operating system, the file interface being an interface to at least one client application back end and the file interface supporting sequential and random read access. This file interface might be used to carry out the communication over the common middleware client library. In some examples, the operating system of the data fetching and delivering entity is a UNIX based operating system.

In some examples, as mentioned above, the fuse daemon is configured to select and to fetch data blocks based on the range of the data of the file by selecting and fetching those immutable data blocks that contain the data within the requested range of data.

In some examples, before the quorum read request for at least one immutable data block is issued by the data fetching and delivering entity, a request from the client application to the fuse daemon comprising the name of the data file is issued when a request for opening the data file is issued by the client application. Hence, the client application is aware data of which file it wants to retrieve. It therefore, for example, issues an open-file request to the database via the fuse daemon, wherein the open-file request contains said file name of the requested data file.

In some examples, the fuse daemon is further configured to retrieve metadata of the file that comprises the list of blocks with their hash value, the size of the file and the block size, and is to store the metadata on the data fetching and delivering entity, wherein the metadata is retrieved also when a request for opening the data file performed by the client application is issued.

The metadata, stored, for example, in the virtual file on the data fetching and delivering entity will then comprise, for example, at least the following values: (i) the size of the file in bytes; (ii) the size of a single immutable data block in bytes; (iii) a list of blocks with their corresponding hash values. This information in the metadata is then used to calculate which immutable data blocks should be requested by the fuse daemon/the data fetching and delivering entity to cover the range of the file.

In some examples, the fuse daemon is to translate the request for a range of data of a file to the quorum read request using the information contained in the metadata, the translation comprising a calculation involving the size of the file, the block size and the requested range, using a calculation rule also obtained from the metadata of the file. The calculation rule is therefore, for example, also obtained when retrieving the metadata of the file.

For example, the block size of an immutable data block could vary depending of the global size of file. For a bigger/smaller global file size in bytes, immutable data blocks with a bigger/smaller size in bytes could be comprised by the file.

In the following, an example of how to determine which immutable data blocks are to be fetched to obtain the requested range of data of the file, using the calculation rule stored in the metadata is presented:

If there is a read request with an intended offset in the file X and a requested data range of Length L, with the block size being known, then the fetching entity will compute the first immutable data block to be retrieved and the number of blocks to be retrieved by:

first block=$X$/block size and numberOfBlocks=$L$−1/block size, wherein the "/" operator indicates an integer division.
It will then retrieve the immutable block from $$\text{first block to last block} = \min\left(\text{first block} + numberOfblock, \frac{Filesize}{\text{block size}}\right),$$

the last block being the last block containing data within the requested range and Filesize being the global size of the file, by retrieving the correct number item (hash value) in the list of immutable blocks and corresponding hash values/key values.

The calculation of which blocks to be retrieved, is performed by the fuse daemon, for example, in the course of the application request to read the file or to fetch the immutable data blocks.

In some examples, at least two versions, preferably three versions of the data file split into the immutable data blocks are kept in a storage of the distributed computer system being able to deliver the version of the datafile to the data distribution entity.

The purpose of keeping at least two versions, preferably three versions of the file is a criterion to have some regular garbage collection that will remove the data that is not needed anymore. Another criterion for this may be, for example, to do not remove a file that is still used by someone. An option to ensure this is, for example, to ask the client to register itself as a user of the file for a certain time, being referred to further as a lease. Because of the possibility of a network crash or a partition crash, the lease may not be infinite because otherwise a dead node could prevent deletion of data forever.

For example, each time a client opens a file, it will beforehand put a lease on the file and should clean the lease or reissue the lease when needed. Then when the garbage collection daemon, for example, will scan the file to purge, it will check if there is a lease on the file or not. This is, for example, implemented by putting an item (filename: e.g. TTL) with the expiration time. If many clients open the file, they will write to the same item. If this item expires, it means nobody needs the file anymore and the item can be deleted.

In some examples, the method being executable on the distributed computer system as described above, the method comprising:
  splitting source-data into immutable data blocks and metadata,
  replicating and storing said data blocks on at least two different storage nodes of a database, wherein the metadata comprises values referencing the immutable data blocks in the at least two storage nodes for a key-value database call,
  translating a request for a range of data of a file triggered by at least one client-side application into a quorum-read request for at least one immutable data block to the database, wherein the quorum-read request comprises a plurality of individual parallel requests to different storage nodes storing the same immutable data block,
  fetching the data blocks delivered by the database in the fastest response and discarding results delivered subsequently to the fastest response,
  generating a virtual file comprising the corresponding range of data from the fetched data blocks.

Furthermore, a computer program product comprising program code instructions stored on a computer readable medium to execute the method steps mentioned above, when said program is executed on a computer, is provided.

BRIEF DESCRIPTIONS OF THE DRAWINGS

Examples of the invention are now described, also with reference to the accompanying drawings, wherein.

The drawings and the description of the drawings are of examples of the invention and are not of the invention itself. Like reference signs refer to like elements throughout the following description of examples.

DESCRIPTION

Figure 1:
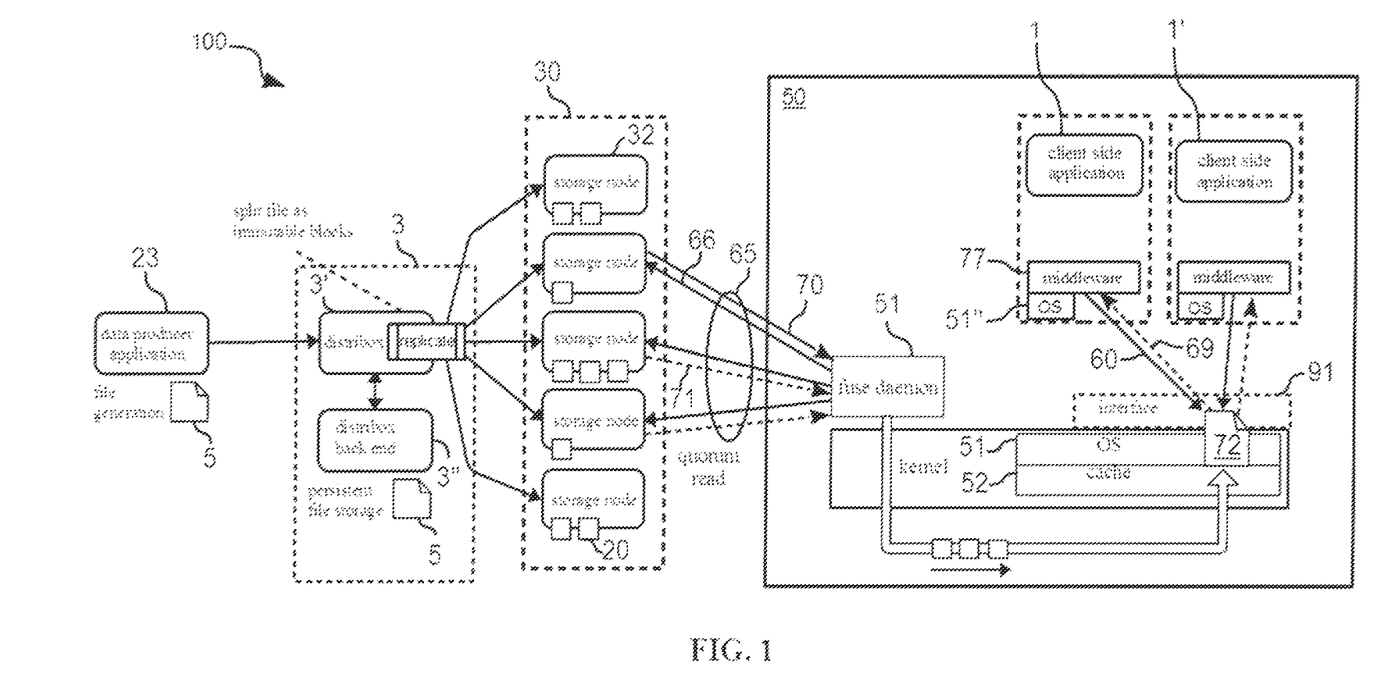
FIG. 1 shows an example of a distributed computer system with a data distribution entity, a database and a data fetching and delivering entity as well as client applications and a fuse daemon, with immutable data blocks being replicated and stored by the data distribution entity on the database and queried via a quorum read by the data fetching and delivering entity.

An example of a distributed computer system 100 with a data distribution entity 3, a database 30 and a data fetching and delivering entity 50 as well as client applications 1, 1' and a fuse daemon 51, with immutable data blocks 20 being replicated and stored by the data distribution entity on the database 30 and queried via a quorum read 65 by the data fetching and delivering entity 50 is shown in FIG. 1.

A data producer application 23 is configured to produce a data file 5, for example, an airport list, exported from an airport dataset. The data producer application 23 is configured to send the generated data file 5 to the data a data distribution entity 3. The data distribution entity 3 comprises a distribution box 3' (also referred to as "distribox") and a distribox back end 3" with the function of a persistent file storage for the data file 5. The distribox 3' is to import the file 5 from the distribox back end 3". The data file 5 comprises data that is, for example, segmented into immutable data blocks 20. The distribox 3' is configured to replicate all or at least a significant part of the immutable data blocks 20 comprised by the data file 5 and store the replicated immutable data blocks 20 storage nodes 32 of a database 30.

In the example illustrated by FIG. 1, the immutable data blocks are replicated five times and are stored on five different storage nodes 32. Hence, in total, twenty-five data blocks 32 are stored on the data base. When the data file 5 is segmented into five different immutable data blocks 20, each storage node 32 may contain a copy of each different immutable data block 20.

Client-side applications 1, 1' might run on respective application servers, indicated by the dashed boxes comprising the client-side applications 1, 1'. Those data consuming applications might are connected to a data fetching and delivering entity 50, which is, for example, an Openshift node. The client-side applications 1, 1' might send a request for a range of data of a file 60 via a middleware that is common to both client-side applications 1, 1' and an application back-end interface 51" to the data fetching and delivering entity 50. From the data fetching and delivering entities side, this communication may take place via file interface 91. The file interface 91 supports sequential and random read access.

If the request for a range of data of file 60 is triggered for the first time, no data corresponding to the requested range of data can be delivered directly from the virtual file 72. Therefore, the data blocks 20 corresponding to said data range 73, 74 (see FIGS. 2 and 3) have to be fetched from the data base 30. For this purpose, the data fetching and delivering entity 50 employs a fuse daemon 51. This fuse daemon is configured to translate the request for a range of data of the file 60 into a quorum-read request 65 for at least one immutable data block 20 to the database 30. After performing this translation to a quorum read request 65 (see the example translation explained in the section before), the fuse daemon 51 issues this request towards the database 30.

Herein, the quorum-read request 65 comprises three individual parallel requests 66 to different storage nodes 32 storing the same immutable data block 20. The parallel requests 66 are identical with respect to the immutable data block 20 they are directed to. As such, all parallel requests 66 are, for example, directed to the first two immutable data blocks 20 of a file 5 comprising overall ten immutable data blocks 20.

The quorum read request 65 is then processed by every storage node 32 to which one of the individual requests 66 is sent and send answers in the form of the requested data blocks 20 towards the data fetching and delivering entity 50. However, the data fetching and delivering entity 50 may receive every response but discards every response except the fastest response 70. Alternatively, the data fetching and delivering entity 50 may receive the fastest response 70 and cause the storage nodes 32 to stop processing those requests that have not been answered yet.

The fuse daemon 51 may receive the data block(s) 20 contained in the fastest response 70 and store these data blocks in a virtual file 72. This virtual file 72 is stored in a page cache 52 of a operating system 51, for example, a LINUX operating system. The fuse daemon 51 is configured to keep fetched data blocks 20 in the page cache 52 as long as possible, hence, until the data file 5 and with it—the data block—has changed. The originally requested range of data 73, 74 may be cut out of the fetched immutable data blocks 20 resident in the page cache's 52 virtual file 72.

From the virtual file 72 in the page cache 52, the requested range of data 73, 74 is delivered in a response to the client-side application(s) 1, 1' in a response 69 to the initial request. As the fetched data blocks 20 are held in the virtual file 72, these immutable data blocks 20 could be used for any future request for a range of data 73, 74 comprised by the previously fetched data blocks. This significantly reduces the processing times for future requests for the same range of data or a range of data 73, 74 also comprised by previously fetched immutable data blocks 20.

Figure 2:
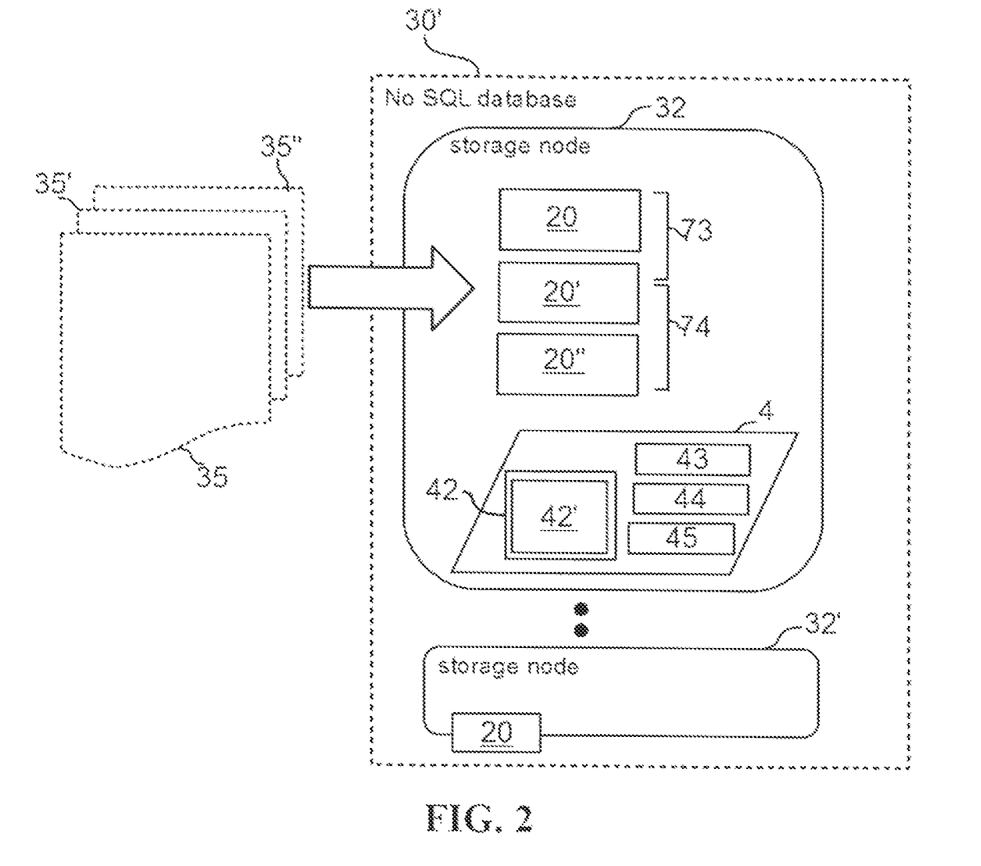
FIG. 2 shows an example of a No SQL database on which data blocks of a versioned file and metadata regarding that file are stored.

An example of a No SQL database on which data blocks of a versioned file and metadata regarding that file are stored is shown in FIG. 2.

Three versions of a data file, namely the latest three versions data file, namely data file 5, data file 5', and data file 5" are kept in an external storage, such as the persistent file storage of a distribox back end 3" shown in FIG. 1. As these data files 5, 5', 5" are external to the illustrated content of NoSQL database 30', they are illustrated in FIG. 2 by dashed shapes. The NoSQL database 30' is a possible implementation of the database 30, shown in FIG. 1.

The storage node 32 of NoSQL database 30', illustrated in more detail in FIG. 2, may store three different immutable data blocks 20, 20', 20". These immutable data blocks 20, 20', 20" are comprised by the latest version of the data file, namely data file 5 and are replicated, among others, to said storage node 32. These immutable data blocks cover two ranges of data 73, 74. The first range of data 73 is comprised by the data block 20 and the data block 20', whereas the second range of data 74 is comprised by the data block 20' and the data block 20". The first range of data 73 might be a range of data corresponding to an actual request for a range of data of a file 60, while the second range of data 74 may correspond to the remaining data of a file 74, outside of the requested range 73.

The NoSQL database 30' stores metadata 4 that is related to the immutable data blocks 20, 20', 20" is stored. The metadata 4 comprises values 42 which are referencing the immutable data blocks 20, 20', 20" for a key-value database call. In the example illustrated by FIG. 2, these referencing values 42 are hash values 42'. For example, each immutable data block 20, 20', 20" is associated with a different unique hash value 42'.

The metadata 4 of the data file 5 comprises a list of blocks with their hash value 42', the size of the file 43 and the block size 44. The metadata 4 of the data file 5 further comprises a calculation rule 45 being readily exposed for retrieval by the data fetching and delivering entity 50 (see FIG. 1). The calculation rule 45 involves a rule for translating a request for a certain range of a file 73 with a certain offset, to a request for certain immutable data blocks 20, 20', 20". This calculation rule 45 uses the size of the file 43 and the block size 44 stored in the list of blocks to put out the hash values for which the data fetching and delivering entity 50 has to query in order to obtain the immutable data blocks 20, 20' corresponding to those two data blocks 20, 20' that comprise the range of data of the file 73. For an example of a such a calculation rule and the application of that rule in order to fetch particular immutable data blocks 20, 20', 20" it is referred to the general description.

Besides the storage node 32, the NoSQL database 30' comprises further storage nodes, such as the storage node 32', on which, for example, the data blocks 20, 20', 20" are stored as well.

Figure 3:
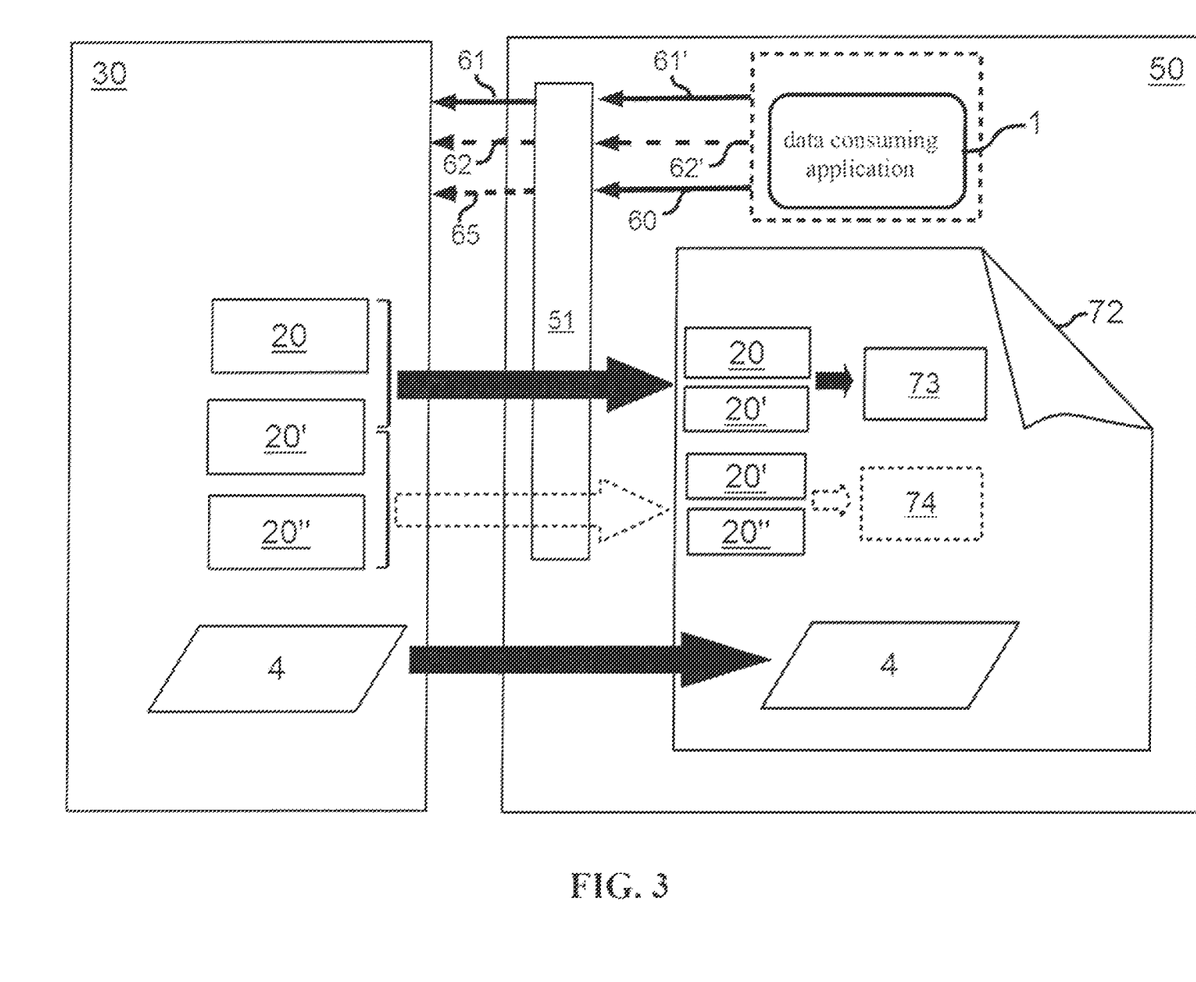
FIG. 3 shows an example of a data fetching and delivering entity in communication with the database for retrieving the data blocks and the metadata to a virtual file stored on the data fetching and delivering entity.

An example of a data fetching and delivering entity in communication with the database for retrieving the data blocks and the metadata to a virtual file stored on the data fetching and delivering entity is shown in FIG. 3.

The data consuming application 1 issues a request for opening the data file 61' to be read out to the fuse daemon 61'. Concurrently with this request 61 or subsequent to this request, a request 62' comprising the name of the data file is sent from the client application 1 to the fuse daemon 51. The fuse daemon 51 issues requests 61, 62 that correspond to the above-mentioned requests 61', 62' to the database. The requests 61' and 62' as well as the requests 61 and 62 can also be realized as a single request.

Subsequent to or concurrently to the request for opening the file 61, 61' the fuse daemon 51 is to retrieve metadata 4 of the data file 5 (see FIGS. 1 and 2). As described in conjunction with FIG. 2, this metadata 4 comprises a list of blocks with their hash value, a size of the file and a block size, as well as a computational rule of how to translate the request for a range of data of the file to a request for certain blocks. The metadata 4 is stored at the data fetching and delivering entity 50, for example, in the virtual file 72.

When the calculation rule is received, the fuse daemon 51 performs a translation of the request for a range of data of a file 60 to said quorum read request 65, which is sent to the database 30.

A first such quorum read request 65 might be sent to retrieve a range of data 73 included in the immutable data blocks 20, 20'. These immutable data blocks 20, 20' are retrieved and stored in the virtual file 72. The data of the immutable data blocks 20, 20' corresponding to the data range 73 may be isolated from these fetched immutable data blocks 20, 20' and the data of the range 73 is, for example, also stored in the virtual file 72.

As such, the immutable data blocks 20, 20' may remain stored in addition to the range of data 73 originally requested by the client application 1 in the request 60 for a range of data. However, the immutable data blocks 20, 20' may also be deleted from the virtual file 72 after having isolated and stored the range of data 73 in the virtual file 72.

In the same way, data from a data range 74, corresponding to the remaining data of the file 5 may be retrieved. This data range 74 is data comprised by the immutable data blocks 20', 20" which are again retrieved by the fuse daemon and stored in the virtual data file 72 on the data fetching and delivering entity 50. Also here, the range of data 74 may be isolated from the immutable data blocks 20', 20".

Figure 4:
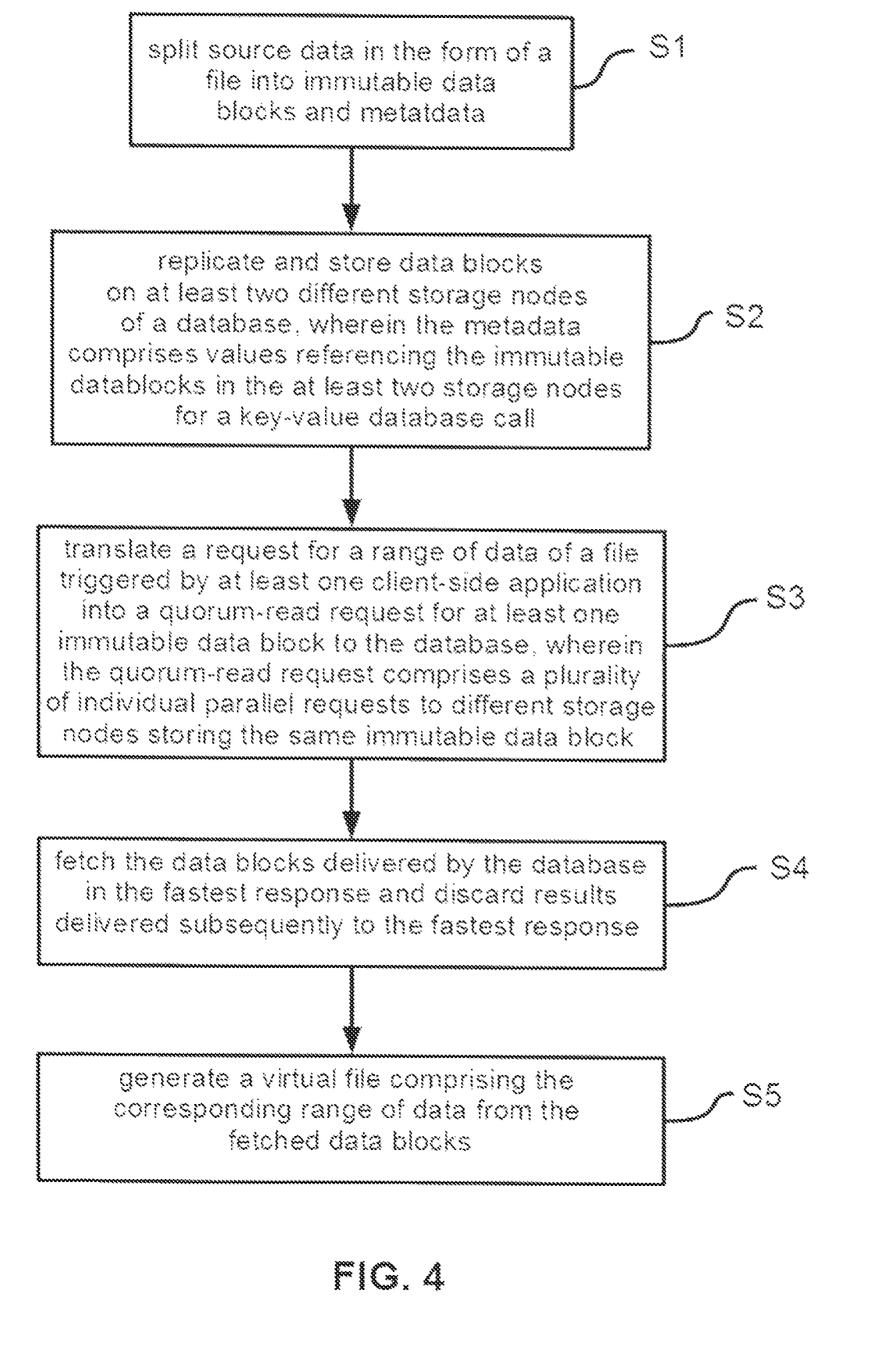
FIG. 4 shows an example of a flow chart illustrating a method of delivering data from a database to at least one client-side application, in a distributed computer environment.

An example of a flow chart illustrating a method of delivering data from a database to at least one client-side application, in a distributed computer environment is shown in FIG. 4.

In activity 51, source data in the form of a data file is split into immutable data blocks and metadata.

In activity S2, the data blocks are replicated and stored on at least two different storage node of a database, wherein the metadata created in activity S1 comprises values referencing the immutable data blocks in the at least two storage nodes for a key-value database call.

In activity S3, a request for a range of data of a file triggered by at least one client-side application is translated into a quorum-read request for at least one immutable data block to the database, wherein the quorum read request comprises a plurality of individual parallel requests to different storage nodes storing the same immutable data block.

In activity S4, the data blocks delivered by the database in the fastest response are fetched and those results delivered subsequently to the fastest result are discarded.

In activity S5, a virtual file comprising the corresponding range of data form the fetched data blocks is created.

The invention claimed is:

1. A distributed computer system having at least one hardware processor and at least one memory, the distributed computer system for delivering data to at least one client-side application, the distributed computer system comprising:
a database configured to store immutable data blocks,
a data distribution entity configured to split source-data in the form of a data file into immutable data blocks and metadata,
wherein the data distribution entity is configured to replicate the immutable data blocks and to store the immutable data blocks on at least two different storage nodes of the database,
wherein the metadata comprises values referencing the immutable data blocks in the at least two storage nodes for a key-value database call,
a data fetching and delivering entity comprising:
a fuse-daemon configured to translate a request for a range of data of a file triggered by at least one client-side application into a quorum-read request for at least one immutable data block to the database,
wherein the quorum-read request comprises a plurality of individual parallel requests to different storage nodes storing the same immutable data block,
wherein the fuse-daemon is configured to fetch the data blocks delivered by the database in the fastest response and is configured to discard results delivered subsequently to the fastest response, wherein upon receiving the fastest response, the fuse-daemon orders the storage nodes of the database to cancel processing of the not yet served requests, wherein one of the different storage nodes responds more quickly than others of the different storage nodes to the quorum-read request and provides the fastest response, and wherein the quorum-read request gives an exact same result for each of the individual parallel requests of the quorum-read request,
wherein the fuse-daemon is configured to generate a virtual file comprising the corresponding range of data from the fetched data blocks.

2. The distributed computer system of claim 1, wherein the data fetching and delivering entity comprises an operating system having an operating system page cache, wherein the operating system page cache is configured to store at least the parts of the fetched data blocks corresponding to the range of data of a file requested by the client-side application.

3. The distributed computer system of claim 1, wherein the data in the virtual file is retrievable by the at least one client-side application as response to the request for a range of data of a file and as response to any future request for the same range of data of a file.

4. The distributed computer system of claim 1, wherein the database comprising the storage nodes is a NoSQL database.

5. The distributed computer system of claim 1, wherein the values comprised by the metadata are referencing values referencing the immutable data blocks for a key-value database call, these referencing values being generated through hash values of each corresponding data block.

6. The distributed computer system of claim 1, wherein the database is configured to deliver data corresponding to the file including data of a data block outside of the requested range of the file.

7. The distributed computer system of claim 6, wherein the virtual file comprises, along with the range of data requested, the metadata of data blocks corresponding to data outside of the requested range of the file.

8. The distributed computer system of claim 6, wherein the fuse daemon is configured to generate the virtual file comprising the metadata.

9. The distributed computer system of claim 1, wherein at least two client-side applications employ a common middleware client library to access the virtual file.

10. The distributed computer system of claim 1, wherein the fuse-daemon is configured to perform the query for the quorum read operation at least three times in parallel and wherein the same data blocks are stored at least three times on at least three different database storage nodes.

11. The distributed computer system of claim 10, wherein the fuse-daemon is configured to perform the query for the quorum read operation three times in parallel and wherein the same data blocks are stored five times on at least five different database storage nodes.

12. The distributed computer system of claim 2, wherein the operating system of the data fetching and delivering entity is a UNIX based operating system.

13. The distributed computer system of claim 1, wherein the fuse daemon is configured to select and to fetch data blocks based on the range of the data of the file by selecting and fetching those immutable data blocks that contain the data within the requested range of data.

14. The distributed computer system of claim 13, wherein before the quorum read request for at least one immutable data block is issued by the data fetching and delivering entity, a request from the client application to the fuse daemon comprising the name of the data file is issued when a request for opening the data file is issued by the client application.

15. The distributed computer system of claim 14, wherein the fuse daemon is further configured to retrieve metadata of the file that comprises the list of blocks with their hash value, the size of the file and the block size, and is to store the metadata on the data fetching and delivering entity, wherein the metadata is retrieved when a request for opening the data file performed by the client application is issued.

16. The distributed computer system of claim 15, wherein the fuse daemon is to translate the request for a range of data of a file to the quorum read request using the information contained in the metadata, the translation comprising a calculation involving the size of the file, the block size and the requested range, using a calculation rule also obtained from the metadata of the file.

17. A computer-implemented method of delivering data to at least one client-side application, the method comprising:
splitting, via a distributed computer system, source-data in the form of a data file into immutable data blocks and metadata,
replicating and storing, via the distributed computer system, said data blocks on at least two different storage nodes of a database, wherein the metadata comprises values referencing the immutable data blocks in the at least two storage nodes for a key-value database call,
translating, via the distributed computer system, a request for a range of data of a file triggered by at least one client-side application into a quorum-read request for at least one immutable data block to the database, wherein the quorum-read request comprises a plurality of individual parallel requests to different storage nodes storing the same immutable data block,
fetching, via the distributed computer system, the data blocks delivered by the database in the fastest response and discarding results delivered subsequently to the fastest response,
upon receiving the fastest response, ordering the storage nodes of the database to cancel processing of the not yet served requests, wherein one of the different storage nodes responds more quickly than others of the different storage nodes to the quorum-read request and provides the fastest response, and wherein the quorum-read request gives an exact same result for each of the individual parallel requests of the quorum-read request,
generating, via the distributed computer system, a virtual file comprising the corresponding range of data from the fetched data blocks.

18. A non-transitory computer program product comprising program code instructions stored on a non-transitory computer readable medium to execute a computer-implemented method of delivering data to at least one client-side application, the method comprising:
splitting, via a distributed computer system, source-data in the form of a data file into immutable data blocks and metadata,
replicating and storing, via the distributed computer system, said data blocks on at least two different storage nodes of a database, wherein the metadata comprises values referencing the immutable data blocks in the at least two storage nodes for a key-value database call,
translating, via the distributed computer system, a request for a range of data of a file triggered by at least one client-side application into a quorum-read request for at least one immutable data block to the database, wherein the quorum-read request comprises a plurality of individual parallel requests to different storage nodes storing the same immutable data block,
fetching, via the distributed computer system, the data blocks delivered by the database in the fastest response and discarding results delivered subsequently to the fastest response,
upon receiving the fastest response, ordering the storage nodes of the database to cancel processing of the not yet served requests, wherein one of the different storage nodes responds more quickly than others of the different storage nodes to the quorum-read request and provides the fastest response, and wherein the quorum-read request gives an exact same result for each of the individual parallel requests of the quorum-read request,
generating, via the distributed computer system, a virtual file comprising the corresponding range of data from the fetched data blocks.

* * * * *